(12) United States Patent
Fu

(10) Patent No.: US 9,189,862 B2
(45) Date of Patent: Nov. 17, 2015

(54) OUTLINE APPROXIMATION FOR POINT CLOUD OF BUILDING

(71) Applicant: Autodesk, Inc., San Rafael, CA (US)

(72) Inventor: Yan Fu, Shanghai (CN)

(73) Assignee: Autodesk, Inc., San Rafael, CA (US)

( * ) Notice: Subject to any disclaimer, the term of this patent is extended or adjusted under 35 U.S.C. 154(b) by 126 days.

(21) Appl. No.: 14/012,702

(22) Filed: Aug. 28, 2013

(65) Prior Publication Data

US 2015/0063707 A1 Mar. 5, 2015

(51) Int. Cl.
*G06K 9/48* (2006.01)
*G06T 7/00* (2006.01)

(52) U.S. Cl.
CPC ..... *G06T 7/0085* (2013.01); *G06T 2207/10028* (2013.01)

(58) Field of Classification Search
None
See application file for complete search history.

(56) References Cited

U.S. PATENT DOCUMENTS 8,224,097 B2 * 7/2012 Matei et al. .................... 382/204
8,818,076 B2 * 8/2014 Shenkar et al. ............... 382/154
2012/0256916 A1 * 10/2012 Kitamura et al. ............. 345/419

OTHER PUBLICATIONS

Lee, et al. ("Extraction and regularization of various building boundaries with complex shapes utilizing distribution characteristics of airborne LIDAR points"), pp. 547-557, ETRI Journal, Aug. 2011.*
Campen, et al. ("Polygonal boundary evaluation of Minkowski sums and swept volumes"), pp. 1-10, Eurographics symposium on geometry processing, 2010.*
Sester, et al. ("Reconstruction of building ground plans from laser scanner data"), pp. 1-11, International conference on geographic information science, 2008.*
Sampath, et al. ("Building boundary tracing and regularization from airborne Lidar point clouds"), pp. 805-812, Photogrammetric engineering & remote sensing, Jul. 2007.*
Wei ("Building boundary extraction based on LIDAR point clouds data"), pp. pp. 157-162,The international archives of the photogrammetry, remote sensing and spatial information sciences, 2008.*
"Gift-Wrapping Algorithm", Wikipedia, last accessed Jun. 3, 2015. http://en.wikipedia.org/wiki/Gift_wrapping_algorithm.
"RANSAC", Wikipedia, last accessed Apr. 30, 2013. wiki: http://en.wikipedia.org/wiki/RANSAC.
Adan, A., et al., "Automatic Creation of Semantically Rich 3D Building Models from Laser Scanner Data", Proceedings of the International Symposium on Automation and Robotics in Construction (ISARC), Jun. 2011.
Dorninger, P., et al., "A comprehensive automated 3D approach for building extraction, reconstruction and regularization from Airborne Laser Scanning Point Clouds", Sensors 2008, vol. 8, 7323-7343.
Dutter, M., "Generalization of Building Footprints Derived from High Resolution Remote Sensing Data", Institut fur Photogrammetrie und Fernerkundung, Technische Universitat Wien, Mar. 2007.

(Continued)

*Primary Examiner* — Daniel Mariam
(74) *Attorney, Agent, or Firm* — Gates & Cooper LLP

(57) ABSTRACT

A method, apparatus, system, and computer program product provide the ability to model a polyline boundary from point cloud data. Point cloud data is obtained and boundary cells are extracted. Potential boundary points are filtered from the boundary cells. Line segments are extracted from the potential boundary points and refined. A regularized polygon is obtained by intersecting the refined line segments.

20 Claims, 7 Drawing Sheets

(56) References Cited

OTHER PUBLICATIONS

Edelsbrunner, H., et al., "Three-dimensional alpha shapes", ACM Trans. Graph. 13(1): 43-72 (1994).

Guercke, R., et al., "Building Footprint Simplification Based on Hough Transform and Least Square Adjustment", 14th ICAISPRS Workshop on Generalisation and Multiple Representation (2011).

Huber, D., et al., "Using Laser Scanners for Modeling and Analysis in Architecture, Engineering, and Construction", In Proceedings of the Conference on Information Sciences and Systems (CISS), Princeton, NJ, 2010.

Jwa, Y., et al., "An Implicit Geometric Regularization of 3D Building shape Using Airborne LiDAR Data", Inter. Archives of Photogrammetry, Remote Sensing and Spatial Information Sciences vol. XXXVII, PartB3A, pp. 69-76, 2008.

Maas, H.-G., et al., "Two algorithms for extracting building models from raw laser altimetry data", ISPRS Jounral of Photogrammetric and Remote Sensing, 54(2-3): 153-163, 1999.

Sester, M., et al., "Reconstruction of Building Ground Plans from Laser Scanner Data", Proceedings of the AGILE, Girona, Spain, 2008.

Shan, J., et al., "Urban Terrain Building Extraction from Airborne LiDAR Data; in : Urban Remote Sensing", CRC Press, Oct. 27, 2006.

Wang, O., et al., "A bayesian approach to building footprint extraction from aerial lidar data", Third International Symposium on 3D Data Processing, Visualization, and Transmission, Jun. 2006, 192-199.

\* cited by examiner

■ SEED BOUNDARY CELL
502

▨ BOUNDARY CELL
504

▩ INTERIOR NON EMPTY CELL
506

OUTLINE APPROXIMATION FOR POINT CLOUD OF BUILDING

CROSS-REFERENCE TO RELATED APPLICATIONS

This application is related to the following co-pending and commonly-assigned patent application, which application is incorporated by reference herein:

U.S. patent application Ser. No. 13/399,158, entitled "SEGMENTATION OF GROUND-BASED LASER SCANNING POINTS FROM URBAN ENVIRONMENT", by Yan Fu and Jin Yang, filed on Feb. 17, 2012;

U.S. patent application Ser. No. 12/849,647, entitled "PIPE RECONSTRUCTION FROM UNORGANIZED POINT CLOUD DATA", by Yan Fu, Xiaofeng Zhu, Jin Yang, and Zhenggang Yuan, filed on Aug. 3, 2010, now U.S. Pat. No. 8,605,093, issued on Dec. 10, 2013, which application claims priority to Provisional Application Ser. No. 61/353,486, filed Jun. 10, 2010, by Yan Fu, Xiaofeng Zhu, Jin Yang, and Zhenggang Yuan, entitled "PIPE RECONSTRUCTION FROM UNORGANIZED POINT CLOUD DATA"; and U.S. patent application Ser. No. 12/849,670, entitled "PRIMITIVE QUADRIC SURFACE EXTRACTION FROM UNORGANIZED POINT CLOUD DATA", by Yan Fu, Xiaofeng Zhu, Jin Yang, and Zhenggang Yuan, filed on Aug. 3, 2010, which application claims priority to Provisional Application Ser. No. 61/353,492, filed Jun. 10, 2010, by Yan Fu, Jin Yang, Xiaofeng Zhu, and Zhenggang Yuan, entitled "PRIMITIVE QUADRIC SURFACE EXTRACTION FROM UNORGANIZED POINT CLOUD DATA".

BACKGROUND OF THE INVENTION

1. Field of the Invention

The present invention relates generally to point cloud data, and in particular, to a method, apparatus, and article of manufacture for approximating the outline of buildings and structures from a point cloud.

2. Description of the Related Art (Note: This application references a number of different publications as indicated throughout the specification by references enclosed in brackets e.g., [x]. Such references may indicate the first named authors and year of publication e.g., [Jones 2002]. A list of these different publications ordered according to these references can be found below in the section entitled "References." Each of these publications is incorporated by reference herein.)

Building information models (BIM) are being increasingly used throughout a building's lifecycle in the Architecture, Engineering and Construction (AEC) industry. BIM models can be used for many purposes, from planning and visualization in the design phase, to inspection during the construction phase, and to energy efficiency analysis and security planning during the facility management phase. However, no design BIM exists for most existing buildings. Further, the BIM created at design time may vary significantly from what is actually built. As a result, there is an increasing interest in creating BIMs of the actual as-built building.

Laser scanners are rapidly gaining acceptance as a tool for 3D modeling and analysis in the architecture, engineering and construction (AEC) domain. With technological development/evolution, laser scanners are capable of acquiring range measurements at rates of tens to hundreds of thousands of points per second, at distances of up to a few hundred meters, and with measurement error on the scale of millimeters [Huber 2010], which make them well suited to densely capturing the as-built information of building interiors and exteriors. Usually, multiple scans are needed to capture the point cloud of a whole building. Laser scanners are placed in various locations throughout and around a building. The scans from each location are registered and aligned to form a point cloud in a common coordinate system.

Currently, as-built BIMs are mostly created interactively form the point cloud data from laser scanners. This creation process is labor-intensive and error-prone. Software tools for processing point clouds have attempted to improve the ability to handle the enormous point clouds produced by laser scanners and to integrate the use of point cloud data into BIM modeling software. Geometric surface or volumetric primitives can be fitted to the 3D point cloud to model walls, floors, ceilings, columns, beams and other structures of interest.

In view of the above, it may be desirable to model a polyline boundary of points from a building scan. However, a boundary determination based on points obtained via a scan of a building is a crucial and difficult step in the building reconstruction task. One reason for the difficulty is that laser scanners have some difficulty in the as-built environment to capture low-reflectance surfaces (e.g., anything painted black), specular surfaces (e.g., shiny metal and mirrors), and transparent or translucent surfaces (e.g. windows), which results in the presence of concavity in the building boundary [Huber 2010]. Moreover, point clouds are often composed of multiple scans with noise and points of non-uniform point density, which will also cause difficulty in a boundary determination. Such problems may be better understood with an explanation of prior art techniques that have attempted boundary extraction.

One category of boundary extraction is purely based on computational geometry methods. [Jarvis 1977] modifies the convex hull formation algorithm to limit the searching space to a certain neighborhood. However, this approach is not very successful in experiments because the distribution of the used points is far from even. [Edelsbrunner 1994] described a so-called alpha-shape determination algorithm, where the shape of a point set is defined as the intersection of all closed discs with radii. This method is computationally complex, and its performance depends on the parameter alpha. Although methods for line simplification (such as Douglas-Peucker) can be applied during the generalization process, this category of boundary extraction methods doesn't take the regular shape characteristics existing in most common buildings into consideration, and thus cannot generate satisfying outline results that can be used for as-built building modeling.

In the last few decades, considerable research effort has been directed toward mainly building outline generation, but most of the prior art is focused on reconstructing building models using aerial imagery and airborne laser scanning data.

In order to generalize the building outline, [Maas & Vosselman 1999] determined the ridge line as a horizontal intersection between roof faces and then use the direction of the ridge line as an approximation for the main direction of the building. [Dutter 2007] starts with an MBR (Minimum Bounding Rectangle) and determines relevant deviations from the rectangle lines. This is done recursively, thus enabling different shapes of buildings like L, T or U-shaped outlines, which limits the generality of Dutter's method. [Shan & Sampath 2007] use straight lines in the main direction of the buildings to approximate the shape and then use least squares adjustment for the adaptation to the original boundary points. [Sester and Neidhart 2008] employ a RANSAC (RANdom Sample Consensus) method to generate a set of initial line hypotheses firstly, and the hypotheses are refined using a least squares adjustment process in which the segments are shifted to fit the original shape and to enforce relations between segments.

[Jwa et al. 2008] rectified noisy polyline by re-arranging quantized line slopes in a local shape configuration and globally selecting optimal outlines based on the Minimum Description Length principles. [Dorninger and Pfeifer 2008] define a coarse approximation of the outline by the computation of a 2D alpha-shape of all the given points and the post-processing of the alpha-shape polygon by a generalization and regularization process. [Guercke and Sester 2011] sample the outline of the polygon into small line segments in a first step and then transform the line segments into Hough space. The lines corresponding to the peaks in the Hough buffer are used to generate initial hypotheses for the polygon outline which is refined by a least squared adjustment procedure to enforce parallel or perpendicular segments.

In view of the above, it is desirable to extract/determine boundaries from building point cloud data in an easy and efficient manner.

SUMMARY OF THE INVENTION

Embodiments of the invention provide a method to model a polyline boundary of points from a building scan. The extracted polyline can be used to model outlines of an entire building or floors and ceilings. To make the boundary extraction process robust for different kinds of point source, the boundary cells are extracted roughly by a flood filling method. Thereafter, the potential boundary points in the boundary cells are filtered through a modified convex hull. Line segments may then be extracted from the boundary points. The line segments are then refined under the constraints of parallel and perpendicular segments which is quite common for elements existing in buildings. Finally, a regularized polygon is obtained by intersecting the refined line segments.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
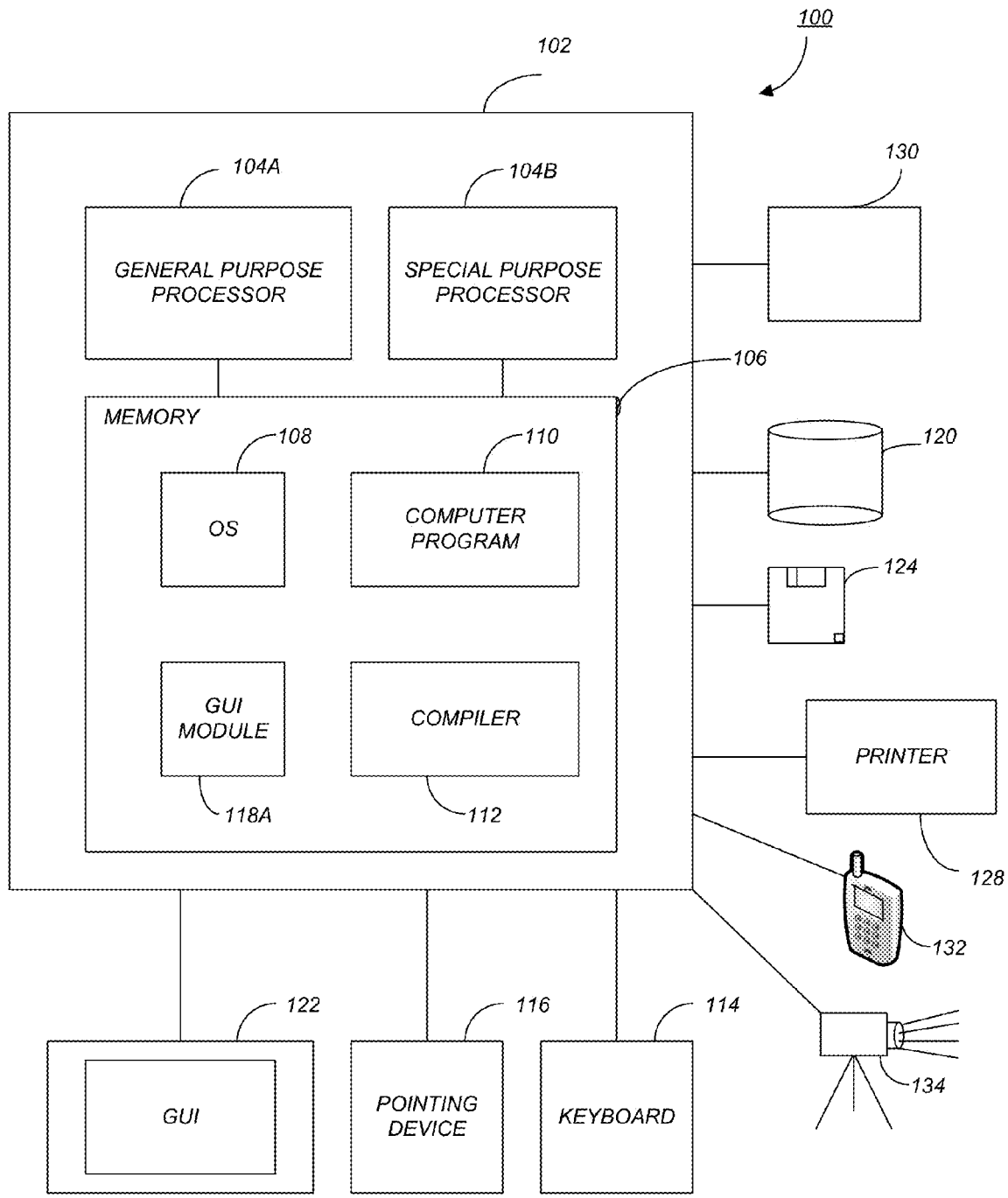
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 may be coupled to, and/or integrated with, a laser scanning device 134. Such a laser scanning device 134 is configured to scan an object or urban environment and obtain a digital representative of such an object/environment in the form of point cloud data that may be processed by the computer 102.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 that allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, cause the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
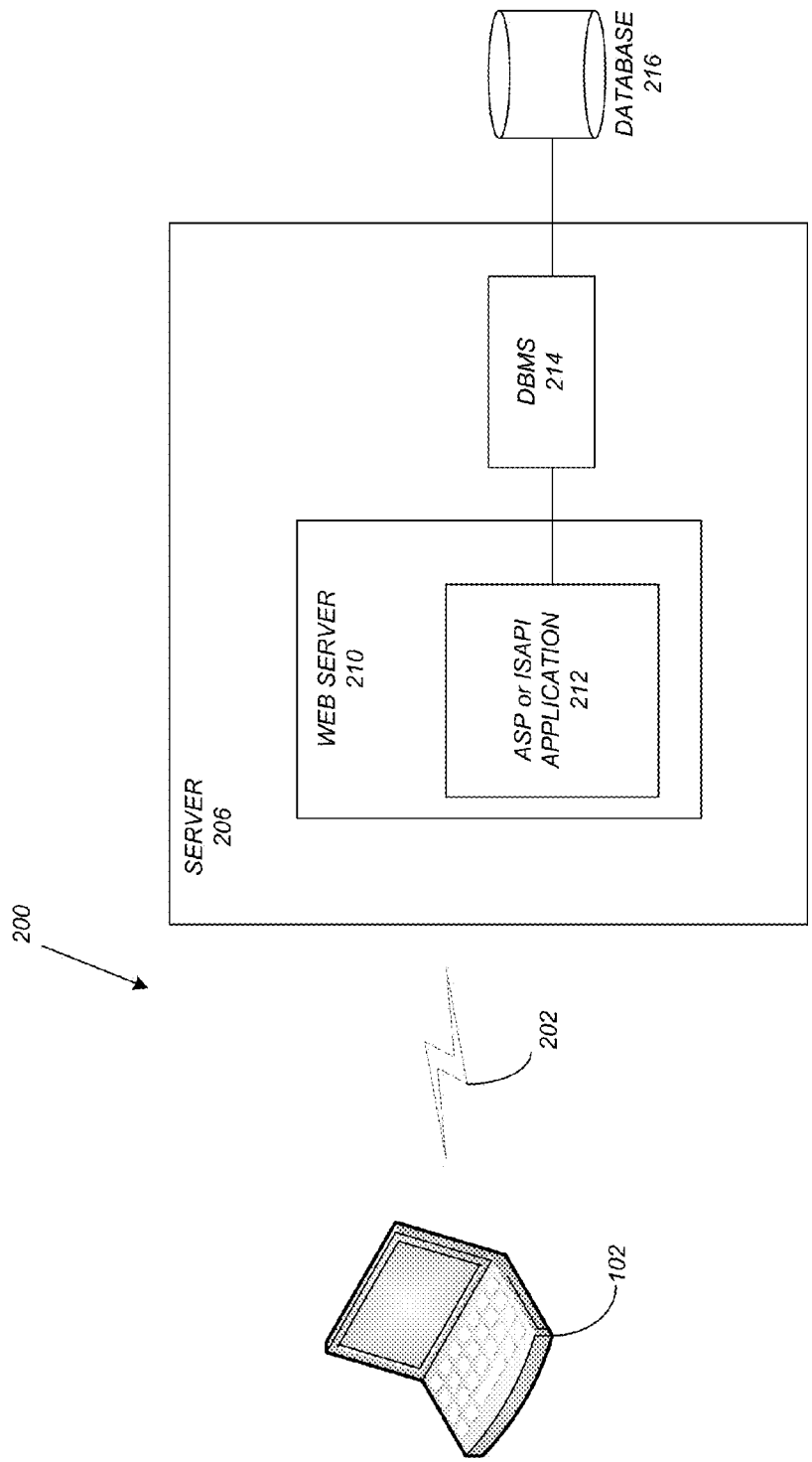
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 102 and servers 206 in accordance with embodiments of the invention.

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 102 may be downloaded from server computer 206 to client computers 102 and installed as a plug-in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 102 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 102 and 206.

Software Embodiment Overview

Embodiments of the invention are implemented as a software application on a client 102 or server computer 206. Further, as described above, the client 102 or server computer 206 may comprise a thin client device or a portable device that has a multi-touch-based display and that may comprise (or may be coupled to or receive data from) a 3D laser scanning device 134.

Figure 3:
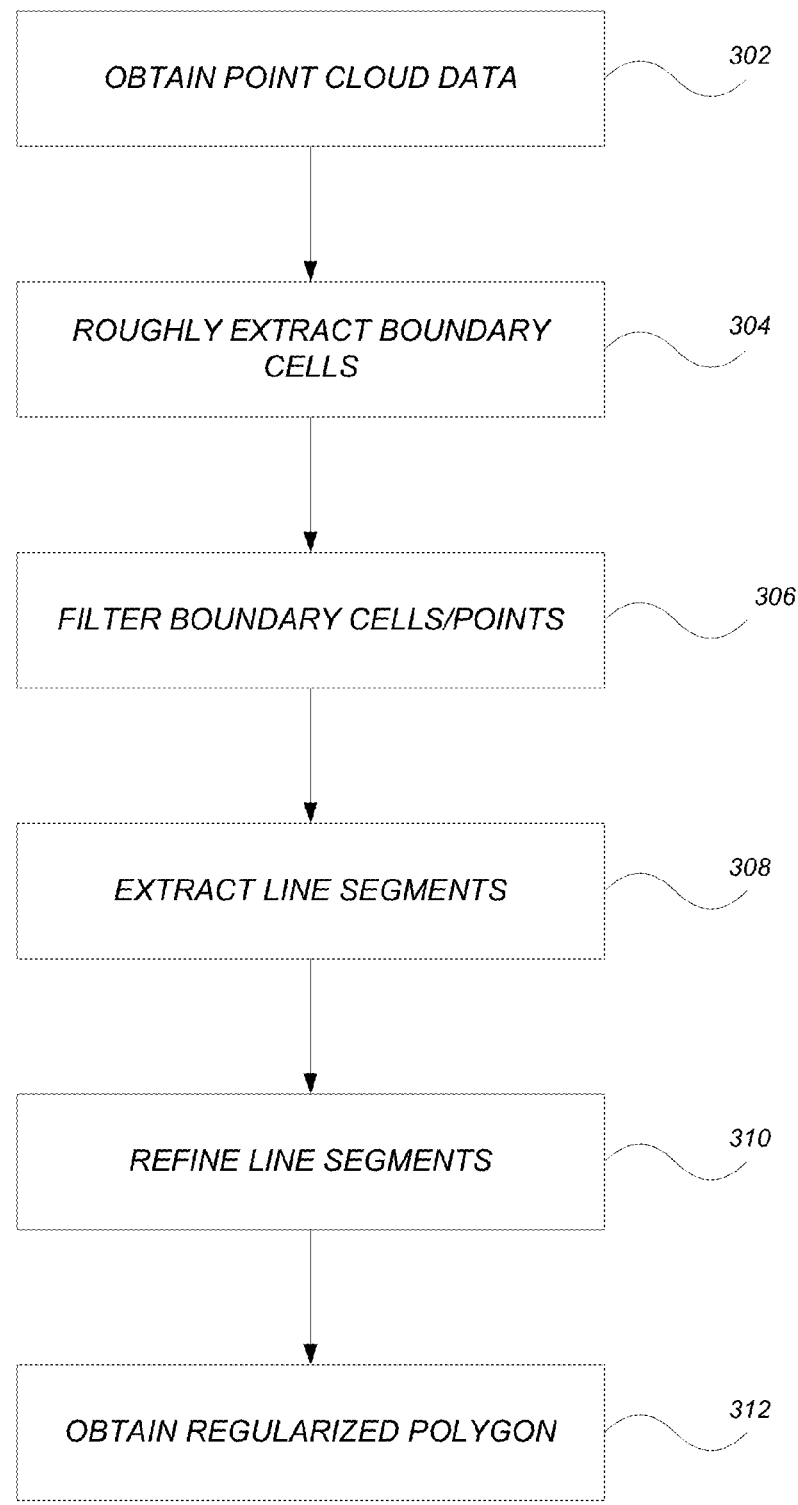
FIG. 3 is a flowchart illustrating the logical flow for performing a boundary extraction process in accordance with one or more embodiments of the invention.

FIG. 3 is a flowchart illustrating the logical flow for performing a boundary extraction process in accordance with one or more embodiments of the invention.

At step 302, point cloud data is obtained (e.g., from a building scan using a laser scanner).

At step 304, the boundary cells are roughly extracted from the point cloud data (e.g., using a flood filling/boundary filling method). As described in further detail below, such a flood filling method may subdivide a 2D bounding box of the point cloud data along an x-direction and a y-direction to form one or more rectangular grids having one or more grid cells. Thereafter, points (from the point cloud) are distributed to the grid cells and steps are performed to ensure that gird cells that are in a most exterior loop of the grid cells are empty cells.

At step 306, potential boundary points in the boundary cells are filtered (e.g., through a modified convex hull as described in further detail below).

At step 308, line segments are extracted from the potential boundary points (e.g., using RANSAC method).

At step 310, the extracted line segments are refined (e.g., under the constraints of parallel and perpendicular segments).

At step 312, a regularized polygon is obtained by intersecting the refined line segments.

Details regarding the performance of one or more of the steps 302-312 are described below.

Boundary Points Extraction

Characteristics of Building Points from Laser Scanners

Step 302 provides for obtaining point cloud data (to be used for extracting a boundary). The points for boundary extraction can be obtained from different sources including points that represent building outlines, floor surfaces and wall surfaces. Due to the reality that laser scanners have difficulty in capturing low-reflectance surfaces, specular surfaces, and transparent or translucent surfaces, point cloud data may include holes from surfaces such as very dark walls and glass windows. As a result, a building outline that should be "closed" (e.g., a closed polygon) becomes open in real cases. Additionally, points obtained from most laser scanners may have non-uniform point density. Consequently, when a uniform grid structure is used to organize the points from laser scanners, adjacent laser scanning points may be distributed into non-neighboring cells in the grid. To overcome such a problem, some prior art techniques have attempted to adjust the grid size. However, defining a proper size grid is difficult (if not impossible) when attempting to avoid this kind of problem. Embodiments of the invention provide a boundary approximation method that attempts to carefully handle the above-described problems.

Potential Boundary Points
Initial Boundary Cells

Figure 4:
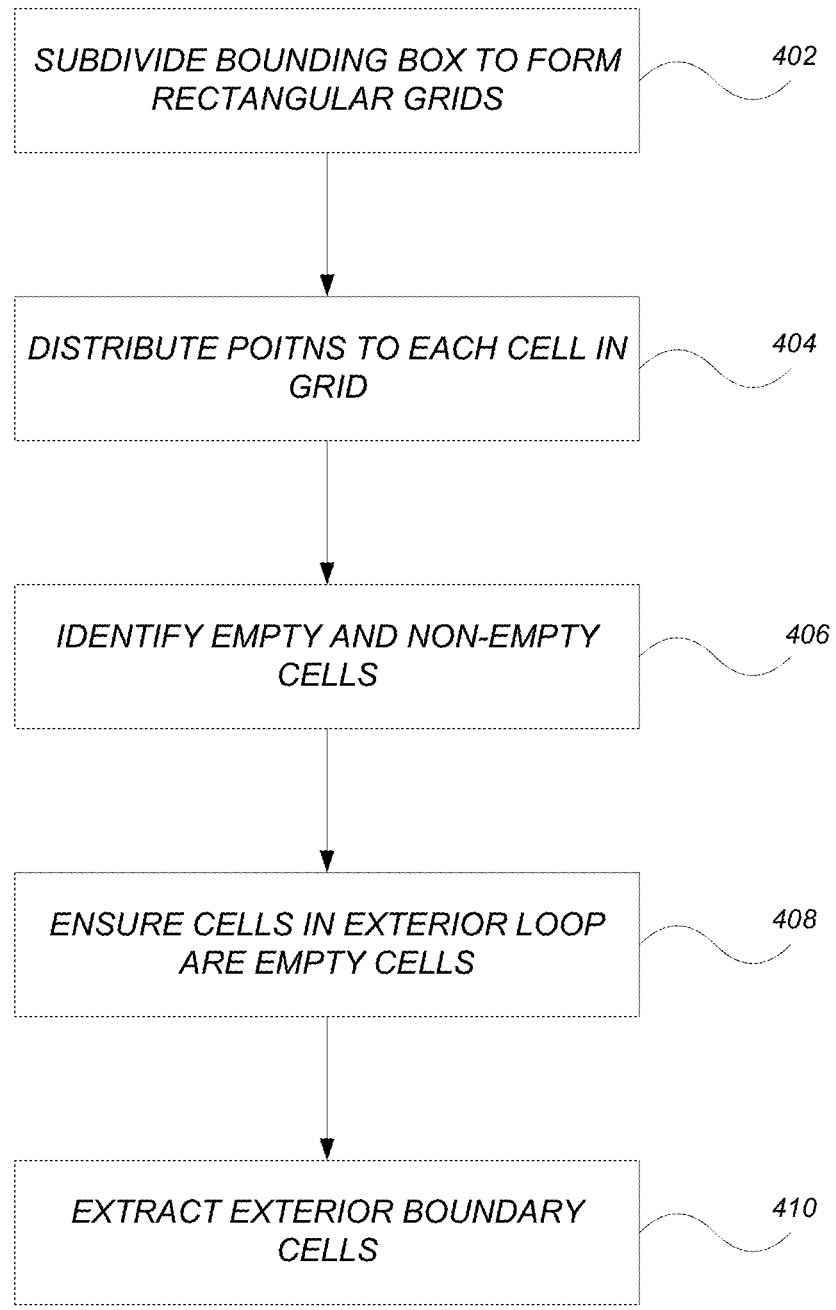
FIG. 4 illustrates details regarding the extraction of potential boundary points (from the boundary cells) in accordance with one or more embodiments of the invention.
Figure 5:
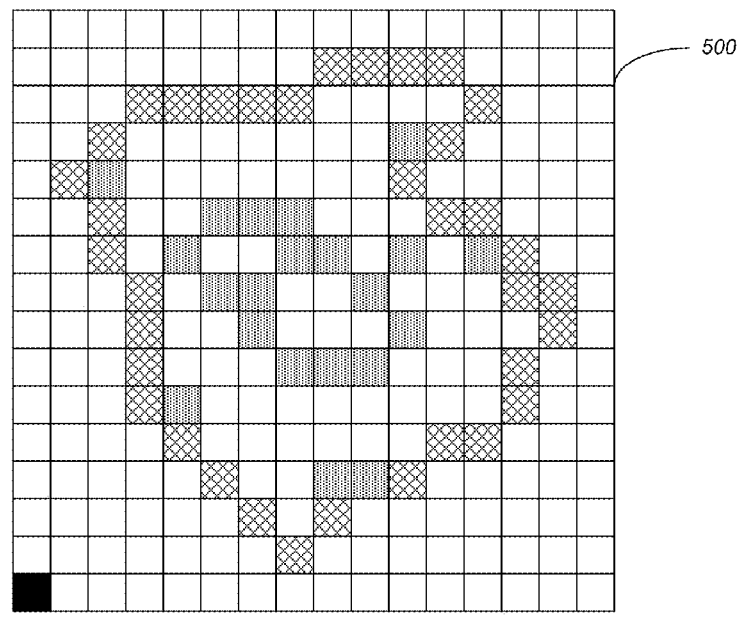
FIG. 5 illustrates the grid structure for the boundary filling process to detect the potential boundary cells in accordance with one or more embodiments of the invention.

Step 304 of FIG. 3 provides for roughly extracting the boundary cells. Such an extraction results in potential cells that may include potential boundary points needed to approximate the outline. FIG. 4 illustrates details regarding the extraction of potential boundary points (from the boundary cells) in accordance with one or more embodiments of the invention. FIG. 5 illustrates the grid structure for the boundary filling process to detect the potential boundary cells in accordance with one or more embodiments of the invention.

To extract the potential boundary points, the two-dimensional (2D) point cloud data are organized in a 2D grid structure 500. To organize the point cloud data, a 2D bounding box of the point cloud data is subdivided along the x and y directions to form some rectangular grids at step 402.

At step 404, the points are distributed to each cell in the grid. In addition, the dimension of a grid cell can be adaptively set to be a multiple of the predefined threshold of discontinuity $\epsilon$ according to the memory capacity. The grid cell dimension can be set based on a user's knowledge about the data precision or based on a multiple of the estimated mean distance. For some 32-bit systems, the total grid size might be too big and cause out-of-memory problems. In this case, one can gradually increase the cell dimension to make the total grid size accommodate the memory size according to the following pseudo-code.

```
Const LONGLONG MAXIMUMGRIDSIZE = 1000000L;
BoxDimension = BoundingBox.Size( );
while(1)
{
    xSize = BoxDimension.x/ cellDimension + 1;
    ySize = BoxDimension.y/ cellDimension + 1;
    LONGLONG lxSize = xSize;
    LONGLONG lySize = ySize;
    LONGLONG totalGridSize = lxSize * lySize;
    if (totalGridSize > MAXIMUMGRIDSIZE)
        cellDimension = cellDimension * 2;
    else
        break;
}
```

At step 406, empty and non-empty cells are identified. In this regard, any cell with one or more points inside is named as a Non-Empty Cell, while any cell without any points inside is named as an Empty Cell.

At step 408, to make sure that the cells in the most exterior loop are empty cells, the grid may be enlarged by expanding one cell along each direction of the grid.

At step 410, the exterior boundary cells are extracted. In one or more embodiments, with the above-defined regular grid structure, a boundary filling method can be used to extract the exterior boundary cells. Starting from the seed background cell 502 (e.g., cell (0, 0)), the boundary filling process (or the boundary cell identification process) iteratively continues until a non-empty cell is encountered (i.e., a cell containing one or more points). In this regard, beginning with the seed cell 502, a check is performed to determine if the seed cell 502 contains any points. If it contains points, it is identified as a boundary cell 504. The function is then called iteratively on cells neighboring the seed cell 502. The function may be executed for either the 4-connected neighbors (i.e., left, right, top and bottom) or 9-connected neighbors (i.e., the four-connected neighbors as well as the diagonal neighbors). The four-connected boundary filling approach may be used to prevent a background cell from propagating into the interior bounded by the boundary cells 504. In addition, a stack based boundary filling instead of recursive boundary filling may be used to prevent stack overflow (e.g., because the area a building footprint covers might be huge).

Expand Boundary Cells

Figure 6:
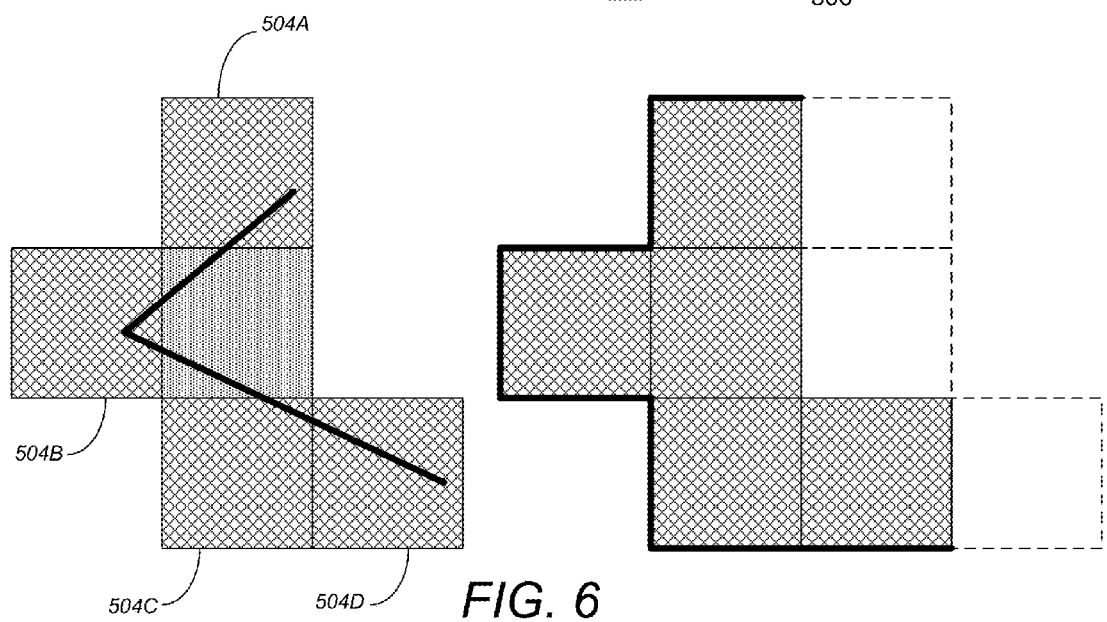
FIG. 6 illustrates the expansion of boundary cells that span across 8-connected boundary cells in accordance with one or more embodiments of the invention.

Although the 4-connected boundary filling method can find most of the boundary cells 504, there are still some cells with boundary points missing. FIG. 6 illustrates the expansion of boundary cells that span across 8-connected boundary cells in accordance with one or more embodiments of the invention. As illustrated, the boundary outlines may span two 8-connected boundary cells 504A-C and go across an interior non-empty cell 506 (see left side of FIG. 6). Thereafter, more boundary cells 504 may be added by further checking the existing boundary cells 504A-D.

Figure 7:
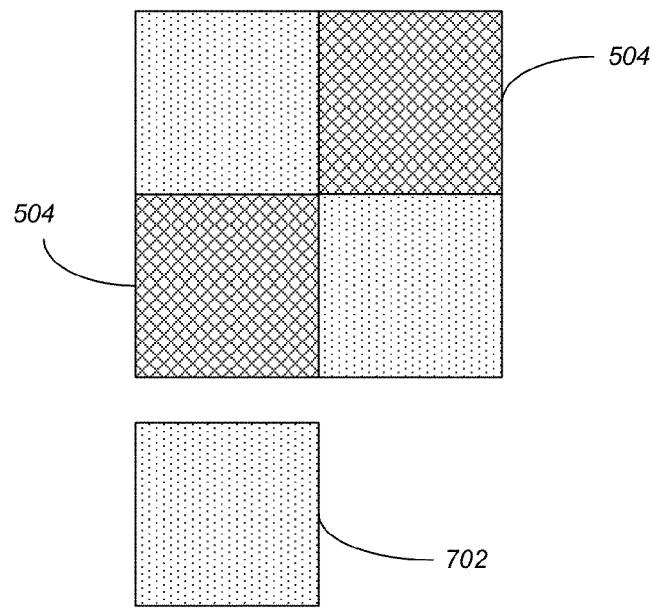
FIG. 7 illustrates the expansion of boundary cells with neighboring cells of diagonal boundary cells in accordance with one or more embodiments of the invention.

FIG. 7 illustrates the expansion of boundary cells with neighboring cells of diagonal boundary cells in accordance with one or more embodiments of the invention. As illustrated, if there are two boundary cells 504 that are diagonal, then their two neighboring cells may be added into the boundary cells set. Thus, cells 702 are the newly added boundary cells that are added to the existing boundary cells set. In this way, all the cells containing the boundary points can be extracted.

Boundary Points Filtering and Resampling

After the boundary cells 504 are extracted, all the points located in the boundary cells 504 are marked as potential boundary points. However, this set of potential boundary points is too dense and noisy to extract a polyline for the outline extraction. Accordingly, a two-step process may be used to filter out the unnecessary points and refine the boundary point set.

Figure 9A:
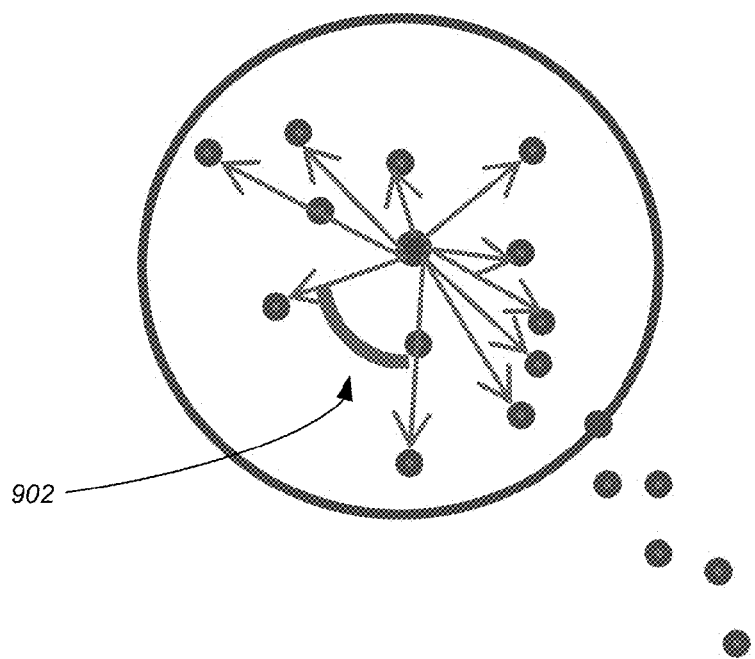
FIGS. 9A and 9B depict the largest angular region with arc lines in accordance with one or more embodiments of the invention.
Figure 9B:
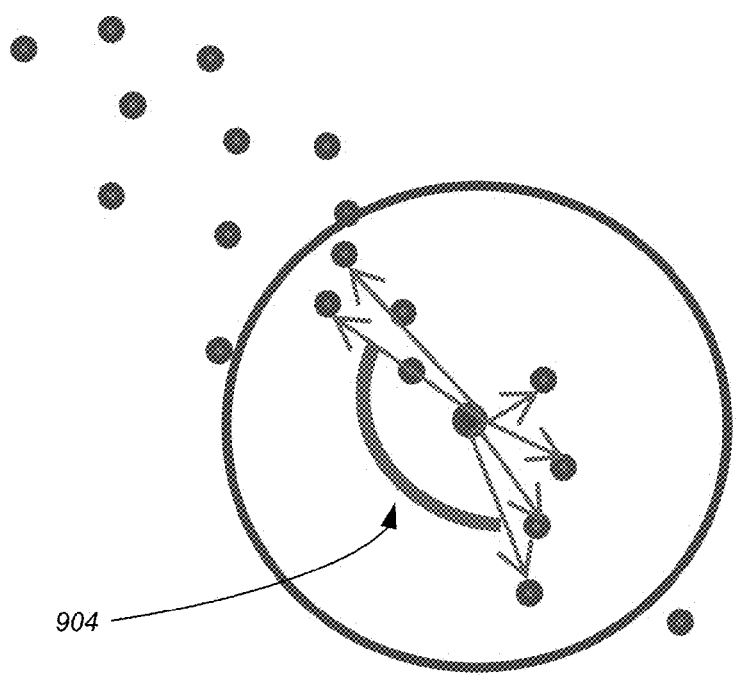

For the first step, the potential boundary points are filtered by calculating the arc range of the neighboring points [Wang et al 2006]. A point on the boundary should have a big arc range where no other points exist. For each potential boundary point $P_i$, take all the neighboring points of this point within a radius of R with point $P_i$ as a center. Calculate the arc range of the neighboring points and find the largest angular region where no point exists. If the largest angular region where there is no existing point is larger than a threshold (e.g., 70 degree), this potential neighboring point is marked as boundary point. FIGS. 9A and 9B depict the largest angular region with arc lines in accordance with one or more embodiments of the invention. The center point in FIG. 9A can be regarded as an interior point (e.g., based on the angular region 902) and the center point in FIG. 9B can be regarded as a potential boundary point (e.g., because the angular region 904 exceeds a threshold).

At the second step, the filtered boundary points are resampled in each cell based on the boundary grid lines. The boundary grid lines are shown as bold lines in the right side of FIG. 6. For each boundary grid line, the point with the shortest distance to it is kept as a potential boundary point. This step further simplifies the boundary point set and makes the sampled boundary points more uniform on the boundary, which benefits boundary curve generation. Some boundary points may be missing using this method. However, a rough outline of the building can be constructed using the filtered boundary points.

Boundary Points Refinement

Ideally, the outline should be closed; while in some cases, the building outline is not closed as there are holes such as doors and windows on the walls. In this situation, the boundary filling method (described above) will mark some cells inside the building as boundary cells 504. Thereafter, not all the extracted boundary points lie on the real outline and the boundary points cannot be directly used for polyline extraction. An example can be demonstrated in FIG. 8 which illustrates a hole 802 on the boundary that will cause a problem to boundary cell detection in accordance with one or more embodiments of the invention.

Figure 8:
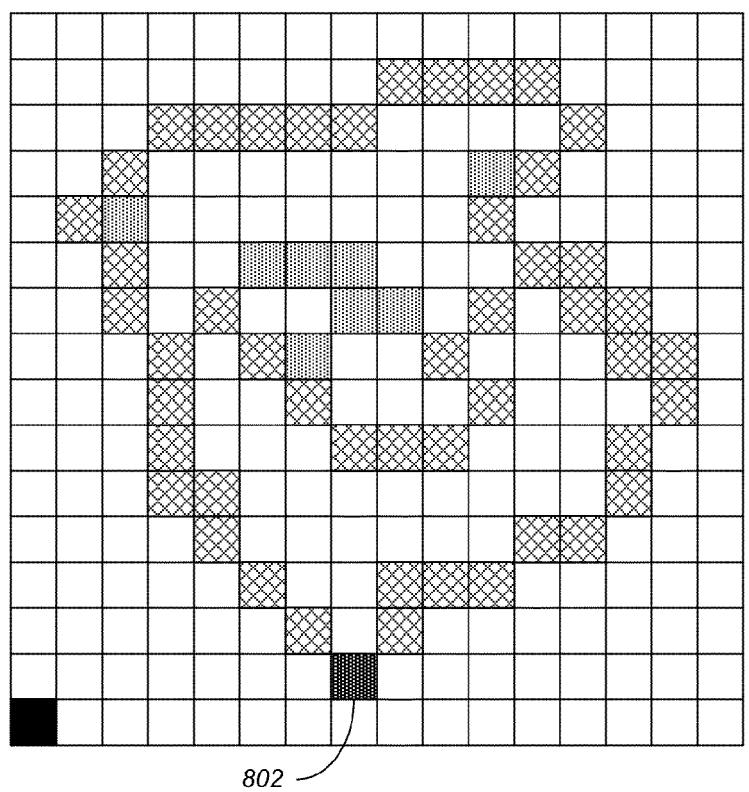
FIG. 8 illustrates a hole on the boundary that will cause a problem to boundary cell detection in accordance with one or more embodiments of the invention.

As illustrated in FIG. 8, if there is a hole 802 on the outline, i.e., cell 802 is missing, the boundary filling method will go through the outline and into the interior of the boundary, thus marking some of the interior non empty cells 506 as boundary cells 504.

As embodiments of the invention may only be concerned with the points on the outline, the points inside the outline should be erased. Embodiments of the invention may utilize a modified convex hull method (e.g., as proposed in [Sampath & Shan 2007]) to approximate the outline and then use the result of the modified convex hull to filter the boundary points. As the dimension of the hole 802 on the wall is not fixed, the neighbor size may be varied from 5 to 30 to be adaptive to the point cloud. If the modified convex hull succeeds and the area of the convex hull approximates the area the building covers, the modified convex hull result is regarded as a good one. All of the boundary points are revisited again, only the boundary points near the modified convex hull are kept as the refined boundary points and used for the following polyline reconstruction.

Polyline Reconstruction

At step 308 of FIG. 3, line segments are extracted from the refined/filtered boundary points. Various methods may be used to extract the line segments.

Hypotheses Line Generation

Embodiments of the invention may use a RANSAC method to extract all the lines contained in the boundary points. As used herein, RANSAC is a method that is able to find a model in a data set in a high presence of noise. Embodiments of the invention may implement RANSAC as follows [RANSAC 2013]:

(1) Randomly select as many data points as are necessary to determine a line model $y=k*x+b$;

(2) Fit a hypothesis line to selected data points, i.e. all free parameters of the model are reconstructed from the inliers with the method of least square line fitting.

(3) Incrementally add neighboring points collected that fit to the hypothesis line. Note that only neighboring points are incrementally added, as the assumption is that the straight line has to be formed of consecutive points. To determine whether a neighboring point fits to the hypothesis line, the subset of data points whose distance to the line is smaller than a given threshold is calculated. If a point fits well to the estimated line model, it is considered as a hypothetical inlier. All points with a distance larger than the threshold are considered as outliers. If enough points are in the subset, the line model is re-estimated from all hypothetical inliers and the subset is stored.

(4) The above described procedure is repeated for a fixed number of times—each time producing either a model that is rejected because too few points are classified as inliers or producing a refined model with a corresponding error measure. After N iterations the subset that contains the most inlier points is chosen.

(5) The above process is iterated with the remaining points. After a candidate line is found, an adjusted line can be calculated using all of the candidate points of that line in a regression analysis.

Each time a line is detected, all of the inlier points of the line are projected onto the line and the line is segmented into several edge intervals.

Polyline Regularization

For most elements of buildings, the planar surface is constructed with a typical relationship between segments on the outline, especially parallel and perpendicular relationships. Embodiments of the invention enable users to select an option regarding whether to retain the parallel or perpendicular relations of the line segments in the polyline reconstruction process to produce regularized outline shapes.

The direction of the longest boundary line segment detected in the RANSAC process is selected as an initial principal orientation. The subsequent lines are adjusted either parallel or orthogonal to this one orientation. The following four cases of the line segment relationship may be considered:

(1) The subsequent line segment is nearly parallel (e.g., within a parallel threshold such as 5 degrees deviation) to the current/first line segment but the distance between the two segments is above a predefined distance threshold. If the above conditions are true, the two segments are forced to be parallel (e.g., by adjusting the subsequent line segment) and an intermediate, orthogonally oriented segment is inserted between these adjacent line segments;

(2) The subsequent line segment is nearly parallel (e.g., within the parallel threshold such as 5 degrees deviation) to the current/first line segment and the distance between the two segments is below a predefined distance threshold. If the above conditions are true, then the two line segments are both maintained but forced to be parallel and extended or trimmed to merge together;

(3) The subsequent line segment is nearly perpendicular (e.g., within a perpendicular threshold such as 85 to 95 degrees) to the current/first line segment. If such conditions are true, then the two line segments are forced to be perpendicular and linked at the intersection point;

(4) If none of the above conditions (i.e., (1)-(3) above) are satisfied, a line segment is inserted to connect the adjacent points of the two line segment.

One may note that a forced regularized boundary may be accepted only if the angular deviation before and after regularization is below a threshold value. Otherwise, the original boundary line may be maintained.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

As described above, the dense but non-uniform point characteristics of point cloud data present difficulties for a perfect outline of the points on a building outline or surfaces. Embodiments of the invention provide a method for extracting the outline of points from a building scanned by ground based laser scanners.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[ADAN 2011] ANTONIO ADAN, XUEHAN XIONG, BURCU AKINCI, AND DANIEL HUBER. Automatic Creation of Sementiacally Rich 3D Building Models from Laser Scanner Data, *Proceedings of the International Symposium on Automation and Robotics in Construction (ISARC)*, June, 2011;

[DORNINGER AND PFEIFER 2008] DORNINGER, P. AND PFEIFER, N.: A comprehensive automated 3D approach for building extraction, reconstruction and regularization from Airborne Laser Scanning Point Clouds, Sensors 2008, Vol. 8, 7323-7343;

[DUTTER 2007] DUTTER, M., 2007: Generalization of building footprints derived from high resolution remote sensing data, *Diploma Thesis TU Vienna*, 2007;

[EDELSBRUNNER 1994], EDELSBRUNNER, H., MÜCKE, E P.: Three-dimensional alpha shapes. *ACM Trans. Graph.* 13(1): 43-72 (1994);

[GUERCKE AND SESTER 2011] GUERCKE, R., AND SESTER, M.: Building Footprint Simplification Based on Hough Transform and Least Square Adjustmen, 14*th ICAISPRS Workshop on Generalisation and Multiple Representation* (2011);

[HUBER 2010] DANIEL HUBER, PINGBO TANG, ANTONIO ADAN, BRIAN OKORN, XUEHAN XIONG. Using Laser Scanners for Modeling and Analysis in Architecture, Engineering, and Construction. *In Proceedings of the Conference on Information Sciences and Systems (CISS)*, Princeton, N.J., 2010;

[JWA ET. AL. 2008]—Jwa, Y., G. Sohn, W. Cho and V. Tao, 2008. An Implicit Geometric Regularization of 3D Building shape Using Airborne LiDAR Data, Inter. Archives of Photogrammetry, Remote Sensing and Spatial Information Sciences Vol. XXXVII, PartB3A, pp 69-76.

[JARVIS 1977] http://en.wikipedia.org/wiki/Gift_wrapping_algorithm

[JWA 2008] JWA, Y.; SOHN, G.; TAO, V.; CHO, W. An implicit geometric regularization of 3d building shape using airborne lidar data. *In International Archives of Photogrammetry and Remote Sensing, XXXVI*, 5, pages 69-76, Beijing, China, 2008;

[MAAS & VOSSELMAN 1999] MAAS, H.-G. & G. VOSSELMAN, 1999: Two algorithms for extracting building models from raw laser altimetry data. *ISPRS Jounral of Photogrammetric and Remote Sensing*, 54(2-3): 153-163, 1999;

[RANSAC 2013] RANSAC wiki: http://en.wikipedia.org/wiki/RANSAC

[SESTER AND NEIDHART 2008] SESTER, M. AND H. NEIDHART, 2008: Reconstruction of Building Ground Plans from Laser Scanner Data, *Proceedings of the AGILE*, Girona, Spain, 2008;

[SHAN & SAMPATH 2007] SHAN, J. & SAMPATH, 2007: Urban Terrain Building Extraction from Airborne LiDAR Data; in: *Urban Remote Sensing, CRC Press*, January 2007; and

[WANG et al 2006] WANG, O., LODHA, K., HELMBOLD, D., 2006, A bayesian approach to building footprint extraction from aerial lidar data", *Third International Symposium on 3D Data Processing, Visualization, and Transmission*, June 2006, 192-199.

What is claimed is:

1. A computer-implemented method for modeling a polyline boundary from point cloud data, comprising:
   obtaining, into a memory of a computer, the point cloud data;
   extracting, using a processor in the computer, one or more boundary cells from the point cloud data;
   filtering, using the processor in the computer, one or more potential boundary points from the one or more boundary cells;
   extracting, using the processor in the computer, one or more line segments from the one or more potential boundary points;
   refining, using the processor in the computer, the one or more line segments;
   obtaining, using the processor in the computer, a regularized polygon by intersecting the one or more refined line segments; and
   utilizing, using the processor in the computer, the regularized polygon to reconstruct a building in a building information model.

2. The computer-implemented method of claim 1, wherein:
   the point cloud data is obtained using a laser scanner; and
   the point cloud data is for a building.

3. The computer-implemented method of claim 1, wherein:
   the one or more boundary cells are extracted by flood filling.

4. The computer-implemented method of claim 3, wherein the flood filling comprises:
   subdividing a two-dimensional bounding box of the point cloud data along an x-direction and a y-direction to form one or more rectangular grids having one or more grid cells;
   distributing points of the point cloud to the one or more grid cells; and
   ensuring that grid cells of the one or more grid cells that are in a most exterior loop of the one or more grid cells are empty cells.

5. The computer-implemented method of claim 4, wherein:
   the one or more boundary cells are extracted from the one or more grid cells using boundary filling.

6. The computer-implemented method of claim 1, wherein the filtering comprises filtering through a modified convex hull by:
   marking all points located in the one or more boundary cells as the one or more potential boundary points;
   for each potential boundary point, fitting a circle to neighboring points and calculating one or more arc ranges between the neighboring points;
   for each of the one or more arc ranges that is larger than a threshold and does not contain a point, marking the potential boundary point as a boundary point; and
   resampling each of the boundary points in each boundary cell, wherein only boundary points nearest to a boundary grid line compared to that of other boundary points are kept.

7. The computer-implemented method of claim 1, wherein:
   the one or more line segments are extracted using RANdom Sample Consensus (RANSAC).

8. The computer-implemented method of claim 1, wherein:
   the refining is under one or more constraints of parallel and perpendicular segments.

9. The computer-implemented method of claim 8, wherein the refining comprises:
   selecting an initial principal orientation for a first line segment of the one or more line segments; and
   adjusting a subsequent line segment of the one or more line segments to be either parallel or orthogonal to the initial principal orientation.

10. The computer-implemented method of claim 9, wherein:
    if the subsequent line segment is within a parallel threshold of being parallel to the first line segment, but a distance between the first line segment and the second line segment is above a distance threshold, then the subsequent line segment is adjusted to be parallel to the first line segment and an orthogonally oriented segment is inserted between the first line segment and the second line segment;
    if the subsequent line segment is within the parallel threshold of being parallel to the first line segment, but the distance between the first line segment and the second line segment is below the distance threshold, then the subsequent line segment is adjusted to be parallel to the first line segment and the subsequent line segment is extended or trimmed to merge with the first line segment;
    if the subsequent line segment is within a perpendicular threshold of being perpendicular to the first line segment, then the subsequent line segment is adjusted to be perpendicular to the first segment and linked at an intersection point of the first line segment and the subsequent line segment;
    if none of the above conditions are satisfied, a third line segment is created and inserted to connect adjacent points of the first line segment and the subsequent line segment.

11. An apparatus for modeling a polyline boundary from point cloud data in a computer system comprising:
    (a) a computer having a memory; and
    (b) an application executing on the computer, wherein the application is configured to:
       (1) obtain the point cloud data into the memory;
       (2) extract one or more boundary cells from the point cloud data;
       (3) filter one or more potential boundary points from the one or more boundary cells;
       (4) extract one or more line segments from the one or more potential boundary points;
       (5) refine the one or more line segments;
       (6) obtain a regularized polygon by intersecting the one or more refined line segments; and
       (7) utilize the regularized polygon to reconstruct a building in a building information model.

12. The apparatus of claim 11, wherein:
    the point cloud data is obtained using a laser scanner; and
    the point cloud data is for a building.

13. The apparatus of claim 11, wherein:
    the one or more boundary cells are extracted by flood filling.

14. The apparatus of claim 13, wherein the flood filling comprises:
    subdividing a two-dimensional bounding box of the point cloud data along an x-direction and a y-direction to form one or more rectangular grids having one or more grid cells;
    distributing points of the point cloud to the one or more grid cells; and
    ensuring that grid cells of the one or more grid cells that are in a most exterior loop of the one or more grid cells are empty cells.

15. The apparatus of claim 14, wherein:
the one or more boundary cells are extracted from the one or more grid cells using boundary filling.

16. The apparatus of claim 11, wherein application is configured to filter by filtering through a modified convex hull by:
marking all points located in the one or more boundary cells as the one or more potential boundary points;
for each potential boundary point, fitting a circle to neighboring points and calculating one or more arc ranges between the neighboring points;
for each of the one or more arc ranges that is larger than a threshold and does not contain a point, marking the potential boundary point as a boundary point; and
resampling each of the boundary points in each boundary cell, wherein only boundary points nearest to a boundary grid line compared to that of other boundary points are kept.

17. The apparatus of claim 11, wherein:
the one or more line segments are extracted using RANdom Sample Consensus (RANSAC).

18. The apparatus of claim 11, wherein:
the application is configured to refine under one or more constraints of parallel and perpendicular segments.

19. The apparatus of claim 18, wherein the application is configured to refine by:
selecting an initial principal orientation for a first line segment of the one or more line segments; and
adjusting a subsequent line segment of the one or more line segments to be either parallel or orthogonal to the initial principal orientation.

20. The apparatus of claim 19, wherein:
if the subsequent line segment is within a parallel threshold of being parallel to the first line segment, but a distance between the first line segment and the second line segment is above a distance threshold, then the subsequent line segment is adjusted to be parallel to the first line segment and an orthogonally oriented segment is inserted between the first line segment and the second line segment;
if the subsequent line segment is within the parallel threshold of being parallel to the first line segment, but the distance between the first line segment and the second line segment is below the distance threshold, then the subsequent line segment is adjusted to be parallel to the first line segment and the subsequent line segment is extended or trimmed to merge with the first line segment;
if the subsequent line segment is within a perpendicular threshold of being perpendicular to the first line segment, then the subsequent line segment is adjusted to be perpendicular to the first segment and linked at an intersection point of the first line segment and the subsequent line segment;
if none of the above conditions are satisfied, a third line segment is created and inserted to connect adjacent points of the first line segment and the subsequent line segment.

* * * * *